United States Patent [19]

Cox et al.

[11] Patent Number: 4,844,721

[45] Date of Patent: Jul. 4, 1989

[54] AIR SCRUBBING PROCESS

[76] Inventors: James P. Cox; Robert W. D. Cox, both of 246 E. Bartlett Rd., Lynden, Wash. 98264

[21] Appl. No.: 106,922

[22] Filed: Oct. 6, 1987

Related U.S. Application Data

[63] Continuation of Ser. No. 856,249, Apr. 24, 1986, abandoned, which is a continuation-in-part of Ser. No. 662,331, Oct. 17, 1984, abandoned.

[51] Int. Cl.$^4$ ............................................. B01D 47/00
[52] U.S. Cl. ......................................... 55/85; 55/84; 55/37; 204/158.21; 568/492; 423/210; 423/275
[58] Field of Search ........................ 55/84, 85, 89–94, 55/37; 585/833–837; 204/158.21, 158.2, 157.15; 423/210, 275; 568/492

[56] References Cited

U.S. PATENT DOCUMENTS

| | | | |
|---|---|---|---|
| 1,303,639 | 5/1919 | Downs | 204/158.21 |
| 3,660,045 | 5/1972 | Gladu | 23/277 C |
| 3,926,744 | 12/1975 | Noll et al. | 568/492 |
| 4,353,715 | 10/1982 | Mir et al. | 55/22 |
| 4,378,235 | 3/1983 | Cosper et al. | 55/85 |
| 4,426,210 | 1/1984 | Drawert et al. | 55/73 |
| 4,528,001 | 7/1985 | Yokogawa et al. | 55/37 |

FOREIGN PATENT DOCUMENTS

| | | | |
|---|---|---|---|
| 0073171 | 3/1983 | European Pat. Off. | |
| 46562 | 4/1975 | Japan | 55/84 |
| 50-46562 | 4/1975 | Japan | 55/84 |
| 94489 | 8/1976 | Japan | 55/68 |
| 51-94489 | 8/1976 | Japan | |
| 144515 | 12/1978 | Japan | 568/492 |
| 153725 | 9/1982 | Japan | 55/84 |
| 57-153725 | 9/1982 | Japan | |
| 1139482 | 2/1985 | U.S.S.R. | 55/84 |
| 548908 | 10/1942 | United Kingdom | 55/84 |

OTHER PUBLICATIONS

Handbook of Chemistry, Lange, published by Handbook Publishers Inc., Sandusky, Ohio, (1952), pp. 738–745.
Kirk-Othmer Encyclopedia of Chemical Technology, Second Edition, vol. 1, p. 460.
McGraw-Hill Encyclopedia of Science and Technology, 1971 Edition, vol. 1, pp. 241 through 242; vol. 4, pp. 333–334; vol. 6, p. 47; vol. 13, pp. 205–206.

*Primary Examiner*—Bernard Nozick
*Attorney, Agent, or Firm*—Robert W. Beach; Ward Brown

[57] ABSTRACT

An aqueous liquid containing unsaturated vegetable, marine or land animal oil or liquid fat, preferably drying or semidrying oil, is used as a scrubbing liquid to remove pollutant from an air stream. Specifically, styrene constituting an air pollutant is sorbed from the air and polymerized to polystyrene by ultraviolet light radiation to facilitate its separation from the scrubbing liquid.

52 Claims, 1 Drawing Sheet

AIR SCRUBBING PROCESS

CROSS REFERENCE

This application of co-pending application Ser. No. 856,249 filed on April 24, 1986 which is a continuation-in-part of our copending U.S. application Ser. No. 662,331, filed Oct. 17, 1984, for Air Scrubbing Process, Apparatus and Scrubbing Liquid both now abandoned.

BACKGROUND OF THE INVENTION

1. Field of the Invention

This invention relates to the purification of air by scrubbing it in contact means such as a scrubber utilizing an effective scrubbing liquid which can be reconditioned for reuse.

2. Problem

Air pollutants are of particulate character, of gaseous character, or both, and such pollutants result principally from industry or combustion. Industrial sources include ventilation products from local exhaust systems and process waste discharges, as well as from combustion. Air pollutants may be more or less odorous and/or pungent.

Known pollution control systems do not completely or effectively remove certain pollutants such as those arising from paint booths, plastics fabricators and some petroleum processes.

Emissions from sewage and sludge treatment, restaurants, renderers, brewers and distillers, fish reduction and processing plants, pulp and paper mills, fertilizer processors and manufacturers, poultry and poultry processing operations, coffee roasting, garbage and garbage incineration, paint booths, enamel baking, internal combustion exhaust, plastics industries, petroleum processes, smelting and mining operations, swine, and other domestic food processing operations, various chemical operations and operations such as printing where odoriferous materials are employed are amenable to treatment at least to some extent by the present invention.

A particular problem is to remove styrene and related products from air.

Technology which may be effective for deodorizing in some types of operation is prohibitively expensive for use in small plants. Thus, a catalytic afterburner that can be used for controlling methyl styrene has both a high basic cost and large operating expense.

Air pollutants must be separated from the scrubbing liquid if the scrubbing liquid is to be reused, which is economically desirable, or if the spent scrubbing liquid is to be discarded in a modern sanitary sewer system and such materials are detrimental to sewage treatment or disposal.

3. Prior Art

The objective of prior art air-cleaning processes has been to remove particulate matter and/or noxious gases and pungency. To remove particulate material, cyclone separators, bag filters and electrostatic precipitators have been used. In wet scrubbers, water is sprayed in atomized condition over a geometric shape to remove water-soluble gases. Chemicals may be added to the liquid to provide improved absorption. These devices provide for mixing a gas stream under treatment with water or a chemical solution so that gases are taken into solution and possibly converted chemically as well. Filters packed with solid absorbents or adsorbents are used to sorb impurities from air.

A typical cyclonic spray scrubber is shown in FIG. 2 and a typical venturi scrubber is shown in FIG. 3 on page 241 of Volume 1 of the *McGraw-Hill Encyclopedia of Science and Technology*, 1971 edition. A cyclone dust separator, a cloth collector and an additional view of a cyclonic liquid scrubber are shown on pages 333 and 334 of Volume 4 of the same publication.

Packed beds providing a bed or layer of packing composed of granular material such as sand, coke, gravel and ceramic rings, or fibrous materials such as glass wool and steel wool are used to remove particulates. Packed towers, plate towers and spray towers, as well as filters are used to adsorb gases.

The same encyclopedia points out at Volume 4, page 334, column 1, that packed beds, because of a gradual plugging caused by particle accumulation, are usually limited in use to collecting particles present in the gas at low concentration unless some provision is made for removing the dust, for example by periodic or continuous withdrawal of part of the packing for cleaning.

The same encyclopedia states in column 2 of the same page that an extremely wide variety of scrubbing equipment is available, ranging from simple modifications of corresponding dry units to permit liquid addition, to devices specifically designed for wet operation only.

In column 2 on page 47 of Volume 6 of the same encyclopedia it is stated that recovery of solute gases is generally achieved by contacting the gas streams with a liquid that offers specific or selective solubility for the solute gas to be recovered. By such procedure mercaptans can be removed from natural gas, or carbon monoxide can be recovered from process streams in petrochemical synthesis. Fluorides can be recovered from emissions from fertilizer and aluminum manufacture and sulfur dioxide can be recovered from metallurgical operations. FIG. 1 on page 48 shows a diagram of a packed tower for gas absorption, FIG. 2 shows a wet cyclone peripheral spray tower and FIG. 3 on page 49 shows a plate tower or impingement baffle scrubber. Page 49 states that the packed tower is used most extensively in absorption operations because of its inherent differential mechanism and low power consumption.

Pages 205 and 206 of Volume 13 of the same encyclopedia states that volatile material can be stripped from scrubbing liquid in order to permit recovery of the absorbed solute and recycling of the solvent. Such stripping can be accomplished by pressure reduction, the application of heat or the use of an inert gas as a stripping vapor or some combination of such procedures. Steam can be used as a stripping vapor for a system which is not miscible with water.

Gladu U.S. Pat. No. 3,660,045, issued May 2, 1972, shows an air-purifying scrubber for removing both gaseous pollutants and particulate pollutants, especially from smoke. Nozzles project jets of combustible gas into the polluted air to heat fumes, such as from a pulp mill, paper mill or smelter, so as to remove or convert the odorous components of the smoke into unobjectionable fumes as stated at column 4, lines 36 to 45. Subsequently, the fumes and smoke are passed through a washing zone into which nozzles project water sprays (column 4, lines 62 to 65). The heating and combustion will complete the oxidation of carbon compounds of the gas and the oxidation or conversion of other noxious and/or odorous components of the gas, such as those containing sulfur (column 4, lines 73 to column 5, line 3). The water from the water sprays will both entrain particulate material and dissolve to a greater or lesser extent water-soluble components of the smoke (column 5, lines 6 to 9).

As stated in column 2, on page 242 of Volume 1 of the *McGraw-Hill Encyclopedia* referred to above, in incineration of municipal garbage volatiles are driven off by destructive distillation and ignite from the heat of the combustion chamber. The gas is passed through a series of oxidation changes but must be heated above 1200 degrees F. to destroy odors. The end products of the incineration pass through expansion chambers, fly ash collectors, wet scrubbers and, in some instances, electrostatic precipitators. The end products include carbon dioxide, carbon monoxide, water, oxides of nitrogen, aldehydes, unoxidized or unburned hydrocarbons and particulate matter comprising unburned carbon, mineral oxides and unburned refuse.

Drawert U.S. Pat. 4,426,210, issued Jan. 17, 1984, was concerned with reducing odor emissions from industrial waste gases from factories of numerous types concerned with industrial food processing, for example, breweries, malting houses, coffee roasting plants, fish processing plants, soup seasoning installations and from factories concerned with the disposal of animal carcasses (column 1, lines 1 to 15). Drawert was especially concerned about odor-emitting substances encountered in breweries during preparation of the mash and boiling of the worts (column 1, lines 21 to 23). This patent recognized that effluent gas had been washed by ozone or chloride of lime (column 1, lines 39 to 41) or had been processed by a variety of adsorption and absorption filters such as biological filters and active carbon (column 1, lines 44 to 46). Drawert proposed to use wash water sprays containing nonionic compounds including partial esters of polyalcohols or ampholytic compounds such as long-chain substituted amino acids or betaines or mixtures of these compounds (column 1, line 64 to column 2, line 11). Drawert contended that the additions of these surface-active substances to the washing water provided solubility for the odor-emitting substances to be removed (column 2, lines 17 to 29). This procedure however is quite different from the procedure of the present invention.

European patent application No. 0 073 171 proposed to remove a wide variety of gaseous contaminants from a gas stream such as generated by industrial manufacturing, storage or commercial processes or operations (page 11, lines 20 to 24) by providing a first absorption system for water-soluble contaminants such as methanol, ethanol, isopropanol, acetone, methyl acetate, mercaptans, glycols, acetic acid, isopropyl ether, pyridine, acetonitrile and dioxane (page 8, line 20 to 24) by using absorption liquids including ethylene glycol, propylene carbonate, butoxy diethylene glycol acetate, acetic acid, high boiling point alcohols, Carbowaxes, polyethylene glycols and polypropylene glycols (page 8, line 32 to page 9, line 5). The gases were then treated by a second absorption liquid in the form of a water-immiscible oil or mixture of oils which is a nonsaponifiable, nondrying mineral, synthetic, paraffinic, animal or vegetable oil of high boiling point as stated at page 9, lines 7 to 20. This second absorption liquid is used to remove gaseous contaminants which are not soluble in the first absorption liquid (page 9, lines 30 to 32). This publication does not suggest the use of unsaturated or drying oils.

Yokogawa U.S. Pat. No. 4,528,001, issued July 9, 1985, is particularly concerned with volatile organic matter consumed or handled as fuels or solvents in various fields of industry, such as the petroleum depot (gas station), petroleum refining plants, painting factories, printing factories, rubber processing factories and general chemical plants where large amounts of volatile organic solvents and vehicles are consumed (column 1, lines 37 to 41). This patent is particularly concerned with volatile organic matter that is insoluble or only slightly soluble in water (column 3, lines 35 to 40). The organic matter to be recoverd from a gas or gas mixture include crude oil, refined petroleum fractions such as petroleum ether, benzene, ligroin, gasoline, light oils, aliphatic hydrocarbons, aromatic hydrocarbons, halogenated hydrocarbons, esters, ketones and ethers listed specifically at column 4, lines 40 to 54. Such pollutants are proposed to be captured by a homogeneous aqueous solution capable of dissolving such pollutants including hemiethers and hemiesters of polyalkylenepolyols specified at column 4, line 68 to column 5, line 20.

While, as stated above, U.S. Pat. No. 4,528,001 mentions painting factories among others, Mir U.S. Pat. No. 4,353,715, issued Oct. 12, 1982, Cosper U.S. Patent No. 4,378,235, issued Mar. 29, 1983 and Japanese Patent Publication No. 51-94489 are all concerned with removing organic solvents from paint spray booths. As stated in U.S. Pat. No. 4,353,715, paint spray booth and paint dryer exhaust gases may contain volatile hydrocarbons, esters, ethers and alcohols such as acetone, methylethyl ketone, toluene, xylene and ethyl acetate (column 1, line 17 to 21). The Cosper patent at column 4, line 67 to column 5, line 2, specifies similar pollutants and in addition mentions methylamyl ketone, petroleum naphthas and diacetone alcohol.

U.S. Pat. No. 4,353,715 uses an oil-in-water emulsion containing a surfactant (column 3, lines 7 and 23). The oil-in-water emulsion scrubbing media comprises a hydrocarbon oil such as a long-chain hydrocarbon or lubricating type of oil in which the solvent from the paint-spray booth is soluble (column 4, lines 18 to 22). The surfactant may be a nonionic, anionic or cationic surfactant containing an oleophilic portion as stated at column 3, lines 19 to 22. The surfactant may be of the petroleum-sulfonate type selected to have adequate solubility for the vapor components to be absorbed as stated at column 5, lines 45 to 48.

U.S. Pat. No. 4,378,235 also advocates the use of an oil-in-water emulsion to sequester paint spray solvents, utilizing a hydrocarbon oil as stated at column 2, lines 17 and 66 and column 5, line 2, which hydrocarbon oil must act as a solvent for the particular volatile organic paint carriers as stated at column 5, lines 2 to 4. Various examples of hydrocarbon oils are given in the seventy-four examples of Table I in columns 5, 6, 7 and 8. The present invention does not use hydrocarbon oil.

To emulsify such hydrocarbon oils of U.S. Pat. No. 4,378,235 saturated and unsaturated fatty acids and alkali salts thereof are used as emulsifiers as stated at column 3, lines 52 to 54, various examples being given in Table I, including oleic acid, sulfonic acid, chlor. stearic acid, stearic acid, palmitic acid, myristic acid, lauric acid, tall oil acid, tallow acids, dioleate ester and fatty alcohol sulfate. Such surfactants are used in proportions from 1.8% to 20%, except that in one instance, Example 37, oleic acid alone was used without any hydrocarbon oil. The percent of reduction by the use of oleic acid alone was 48.2% in ten minutes and 42% in twenty minutes which was a considerably lower reduction than that achieved by many of the other examples given using hydrocarbon oil.

The Japanese Patent Publication No. 51-94489 contacts the organic solvent gas from a paint booth with odorless high-boiling point oil in order to dissolve the organic solvent gas into the oil. The gas is squirted through a body of the oil which may be vegetable oil such as olive oil and castor oil but mineral oils can also be used. Olive oil and undehydrated castor oil are not drying oils or semidrying oils or polyunsaturated oils such as used in the process of the present application. The organic solvents can be separated from the oil by centrifuging.

Japanese Patent Publication No. 57-153725, 1982, is particularly concerned with deodorizing malodorous gas generated in the treatment of human and animal feces and other waste such as garbage. The treatment involved passing the gas through a body of heated oil such as animal oil, vegetable oil or mineral oil in a deodorization tank under low pressure. After passing through the tank, the gas is again contacted with a spray of the oil removed from the tank and returned to the tank. This process is purported to remove from the air compounds such as indol and scatol. The process does not propose to use unsaturated or drying oils as used in the invention of this application.

Thus various procedures have been used to purify air with greater or less success but conventional procedures have been unable to remove certain air pollutants, particularly styrene chemicals. British Pat. No. 548,908 of 1942 makes reference to removing gases containing hydrocarbons resulting from processing coal gas and specifically mentions styrene at page 1, lines 21 and 56. Previously it has been the common practice to scrub the gas with large quantities of mineral oil to remove undesirable constituents and recover light oils (page 1, lines 18 to 24) and the invention of that British patent involved incorporating in the mineral scrubbing oil of a small quantity of one or more alkyl aminophelols (page 1, lines 69 to 73). The scrubbing oil was brought into contact with the gas by countercurrent flow in a column or by spraying the gas with oil (page 1, lines 82 to 86). This patent also proposed the use of a relatively stable and inert organic liquid having a boiling point not substantially below 250 degrees centigrade as a substitute for mineral oil at page 2, lines 42 to 47. It is applicant's experience that mineral oil is not effective to remove styrene pollutant from air.

Air-filtering processes generally have required the expenditure of considerable power, or have required the utilization of expensive equipment and/or materials, or have been of limited capacity, or have required frequent and expensive reconditioning of sorption materials.

Adsorption beds packed with activated carbon, activated alumina, activated bauxite, acid-treated clays, iron oxide, magnesia and fuller's earth have been used to adsorb gases as stated in the *Kirk-Othmer Encyclopedia, Second Edition*, Volume 1, page 460. Such solid materials are generally expensive so that it is the practice to revitalize them to provide regenerated adsorptive material and this operation must be performed frequently because of the limited adsorptive capacity of such substances. The bed material must be physically removed and transported from the location of the filter bed to the reprocessing equipment. The regenerating operation results in significant physical loss of the filter bed material, as well as the material adsorbed by the filter material being lost.

In some installations, instead of using solid filter material, chemically active liquids are used in a scrubber. In order for such scrubbing solutions to be effective, intricate and large applicator equipment is employed to provide sufficient residence or contact time for the purging chemical reaction to occur.

To reclaim liquid scrubbing media, copious water washing, filtration, gravity settling, steam stripping, sonic or ultrasonic treatment, reaction with one or more of selected reactants and/or exposure to ultraviolet radiation may be utilized to effect precipitation and removal of the sorbed pollutants from the scrubbing liquid to prepare it for reuse.

SUMMARY OF THE INVENTION

It is the principal object of the present invention to utilize a scrubbing liquid which is more effective for removing pollutants from air than scrubbing liquids previously used.

A further object is to remove pollutants such as odors, pungency and toxic substances more effectively, completely, quickly and economically than prior processes have accomplished.

Especially it is an object to remove from air particularly noxious materials such as styrene, acrolein and sewage odors which are entrained by the air in some industrial plants and for which no previous effective treatment has been available.

Another object is to utilize a liquid sorbent for pollutants carried by an air stream which is effective and inexpensive.

An additional object is to purify air in an industrial plant so that it can be recycled into the plant with minimal loss or gain of heat and thus minimize the need for increased heating in the winter or cooling in the summer.

It is also an object to minimize change in humidity of the air being purified so that modification of the purified air humidity will not be necessary.

Another object is to utilize a scrubbing liquid which after treatment of the air will be precipitated readily from the air stream so that no appreciable amount of the scrubbing liquid will be lost in the air discharged from the treating apparatus or itself become a pollutant of the air.

Further, it is an object to utilize a liquid sorbent which will have an affinity for various types of air pollutants so as to accomplish a superior purification operation.

Another object is to utilize a liquid sorbent which is harmless so that any portion of the sorbent which is carried off in the treated air will be innocuous and not unpleasant to people or animals breathing such air.

A further object is to utilize the liquid sorbent in a process which, while effective, can be accomplished quickly and with minimum power utilization.

It is also an object to utilize a scrubbing liquid from which air pollutants can be removed without great difficulty so that the reconditioned scrubbing liquid can be reused for air purification purposes.

Another object is to treat certain air pollutants during the scrubbing operation so as to facilitate stripping of pollutants from the scrubbing liquid following the scrubbing operation in reconditioning the scrubbing liquid for reuse.

An object is to utilize scrubbing liquid which is readily available and inexpensive and which does not create difficult disposal problems.

Moreover, it is an object to separate from the sorbent liquid pollutants that have been sorbed by it which will be in a form that can be used beneficially or discarded without creating problems.

The foregoing objects can be accomplished by utilizing a scrubbing liquid which is an unsaturated fatty oil, preferably a polyunsaturated fatty oil, or which contains a substantial proportion of unsaturated fatty oil, preferably polyunsaturated fatty oil. If the scrubbing liquid is not entirely unsaturated fatty oil, a substantial portion of the remainder of the scrubbing liquid is water with which the oil forms an emulsion. Also, it is preferred that the scrubbing liquid include a small proportion of a detergent or wetting agent. In addition, the emulsion may carry reactants for reaction with impurities sorbed from polluted air to form precipitates that can be washed out of spent scrubbing liquid or be removed by distillation. The polyunsaturated fatty oil preferably is a vegetable oil, although it may be a marine oil or a land animal oil. During the passage of air through a path into which the scrubbing liquid is sprayed, the air may be subjected to sunlight and/or ultraviolet light to promote polymerization of vaporous pollutants, such as styrene, for converting them into solid particulate form, such as polystyrene.

DETAILED DESCRIPTION

An essential component, if not the principal component, of the scrubbing liquid utilized in the air purification process of the present invention is an unsaturated fatty oil, preferably considerably polyunsaturated, that is, having more than one double bond. A vegetable oil is favored, but the oil may be marine oil. The iodine value is a measure of the degree of unsaturation of the oil. Petroleum oil or mineral oil is not used in the process.

The preferred fatty oils used in or for the scrubbing liquid because of their ready availability and effectiveness are listed below with their iodine values according to Lange, *Handbook of Chemistry*, Tenth Edition, 1961, pages 756 to 763, Kirk-Othmer *Encyclopedia of Chemical Technology*, Second Completely revised edition, Volume 7, page 404 and Volume 8, page 778–782, and Van Nostrands, Scientific Encyclopedia, Sixth Edition, tables following page 2914.

| | IODINE VALUE | | | |
|---|---|---|---|---|
| UNSATURATED OIL | LANGE (pp. 760–763) | LANGE (pp. 756–759) | KIRK-OTHMER | VAN NOSTRANDS |
| corn oil | 113–126 | 111–128 | 103–128 | |
| cottonseed oil | 111–115 | 103–111.3 | 99–113 | 109–116 |
| groundnut or peanut oil | 96–103 | 88–98 | 84–100 | 88–98 |
| rape oil | 99–106 | 94–105 | 97–108 | 100.3 |
| safflower oil | 148 | 122–141 | 140–150 | 140–152 |
| soybean oil | 115–140 | 122–134 | 120–141 | 137–143 |
| sunflower or sunflower-seed oil | 124–134 | 129–136 | 125–136 | 130–135 |

Other unsaturated fatty oils that may be used but are not as plentiful or economical are:

| | IODINE VALUE | | | |
|---|---|---|---|---|
| UNSATURATED OIL | LANGE (pp. 760–763) | LANGE (pp. 756–759) | KIRK-OTHMER | VAN NOSTRANDS |
| almond oil | 93–96.5 | 93–103.4 | 95 | |
| hempseed oil | 141 | 145–161.7 | 140–175 | |
| linseed oil | 179–192 | 175–202 | 170–204 | |
| sesame oil | 110–116 | 103–117 | 103–116 | 103–114 |
| tung oil | 144–159 | 163–171 | 160–175 | |
| walnut oil | 150 | 139–150 | 155.7 | |
| wheat-germ oil | | | 128.6 | |

While marine and fish oils can be used instead of vegetable oils, it might, in some cases, be undesirable to use such oils because of their distinctive odor which, instead of completely deodorizing the air, could impart a different, and perhaps disagreeable, odor to the air, unless the oil used has been deodorized prior to use. The oil used in or for the scrubbing liquid should, for many applications, be substantially odorless.

Other oils that can be used are:

| | IODINE VALUE | | |
|---|---|---|---|
| UNSATURATED OIL | LANGE (pp. 760–763) | LANGE (pp. 756–759) | KIRK-OTHMER |
| acorn oil | | 100.0 | |
| apricot-kernel oil | 99.4–108 | 100–108.7 | 108.7 |
| beechnut oil | 114 | 97–111 | |
| brazil nut oil | | 90–106 | |
| candlenut oil | | | 164.3 |
| *Aleurites moluccana* | | 163–164 | |
| *Aleurites triloba* | | 139–143.8 | |
| chaulmoogra oil | | | |
| U.S.P. X Revision | | 98–104 | |
| Taraktogenos Kurzil | 103 | 97.6–110.4 | |

-continued

| UNSATURATED OIL | IODINE VALUE | | |
| --- | --- | --- | --- |
| | LANGE (pp. 760-763) | LANGE (pp. 756-759) | KIRK-OTHMER |
| cherry kernel oil | 104-114 | 110-114.3 | |
| cod-liver oil | 130-170 | 137-166 | 118-190 |
| crambe seed oil | | | |
| croton oil | 112 | 108-109 | |
| dehydrated castor oil | | | 112-135 |
| dolphin oil or porpoise oil | | 126.9 | |
| grapefruit seed oil | | | 100.8 |
| grape-seed oil | 99 | 94.3-135 | |
| herring oil | | 102-149 | 115-160 |
| kapok oil | | | 86-110 |
| menhaden oil | | 148-185 | 148-185 |
| mustard-seed oil | 94-98.4 | 95 | 103 |
| oiticica oil | | | 205-220 |
| orangeseed oil | | | 97.6 |
| perilla oil | 200-211 | 185-206 | 193-208 |
| plum kernel oil | 95.7-104 | 100-103.6 | |
| poppy-seed oil | 139 | 128-141 | 133.4 |
| pumpkin-seed oil | 134 | 121-130 | |
| ravison oil | | | 108.5 |
| rice-bran oil | | | 99.9 |
| sardine oil | | 150-193 | California: 170-188 Japanese: 160-190 |
| seal oil | 186-201 | 130-152 | 162.2 |
| shark oil | | 115-139 | |
| sorghum oil | | | 119.0 |
| stillingia oil | | | 185.8 |
| whale oil | 131 | 90-146 | 110-135 |

Even nonmineral waste or byproduct unsaturated oil or oil combinations from restaurants, renderers, or fish processors may be used if they have a sufficiently high average iodine value—at least 90.

Some of the oils specified above may be boiled oil, sulfonated oil, washed oil, steam-distilled oil, sonically-treated oil, acid-treated oil, alkali-treated oil, solvent-extracted oil, burned oil, catalytically-burned oil, oxidized oil, reduced oil, aldehyded oil, chlorinated oil, sulfonated oil, gravityseparated oil or blown oil to increase their suitability or effectiveness or to reduce their characteristic odor.

It is to be noted that the oils used in the process of the present invention exclude mineral oil and essential oils. Also oils having an average iodine value below 90, such as olive oil with an iodine value of 79-88, or undehydrated castor oil with an iodine value of 84 or 81 to 91, are not suitable for the present process.

Of the oils listed above, the following oils according to their definitions in *Webster's Third New International Dictionary, Unabridged*, are drying oils or semidrying oils, as distinguished from nondrying oils:

Drying Oil candlenut oil
dehydrated castor oil
hempseed oil
linseed oil
menhaden oil
oiticica oil
perilla oil
poppy-seed oil
safflower oil
sardine oil
stillingia oil
tung oil Drying Oil or Semidrying Oil soybean oil
sunflower oil or sunflower-seed oil Semidrying Oil corn oil
cottonseed oil
grape-seed oil
kapok oil
mustard-seed oil
sesame oil Semidrying Oil or Nondrying Oil rape oil Nondrying Oil almond oil
apricot-kernel oil
peanut oil McGraw-Hill *Encyclopedia of Science and Technology*, Third Edition, states at Volume 4, page 327, that a good drying oil should have a high iodine value of about 130.

In general unsaturated oils contain a mixture of fatty acids, and the more unsaturated the oils are the higher will be their iodine value. The higher the degree of unsaturation and the higher the iodine value, the greater is the content of fatty acids having more than one double bond. All of the oils discussed above are or contain unsaturated fatty acids, and preferably polyunsaturated fatty acids, that is, fatty acids with more than one double bond between carbon atoms such as linoleic acid and linolenic acid. Oleic acid or palmitoleic acid and ricinoleic acid have one double bond, linoleic acid and erucic acid have two double bonds, linolenic acid has three double bonds and arachidonic acid has four double bonds. Other polyunsaturated acids are licanic acid and eleosteric acid.

It is desirable for the unsaturated oil used in the process of this invention to have more than half of its content polyunsaturated fatty acid, that is, unsaturated fatty acid having more than one double bond between carbon atoms. It has been found that a combination of oleic acid and linoleic acid in equal parts by weight or volume makes an effective scrubbing medium.

The weight percentage content of such acids is given in the following table for representative unsaturated oils.

Depending on the circumstances of use 0.001 percent to 100 percent of the scrubbing liquid by weight should be oil, a preferred proportion for biological processing operations being 0.001 percent to 8 percent, for chemical operations 1 percent to 10 percent, for organic sol-

| OIL | IODINE VALUE | SATURATED | OLEIC or OLEATE | LINOLEIC or LINOLEATE | ERUCIC | LINOLENIC or LINOLENATE | ELEOSTERIC or ELEOSTEARATE | LICANIC or LICANATE |
|---|---|---|---|---|---|---|---|---|
| Corn | 103–128 | b 10.7 | 30.1 | 56.3 | | | | |
| cottonseed | 99–116 | a 25 | 40 | 35 | | | | |
| | | b 27.2 | 22.9 | 47.8 | | | | |
| | | c 27 | 18–19 | 47–50 | | | | |
| crambe | | b | | | high proportion | | | |
| deyhdrated castor oil | 112–135 | a 5 | 10 | 85 | | 0.4 | | |
| linseed | 170–204 | a 10 | 18 | 17 | | 55 | | |
| octicica | 205–220 | a 10 | 6 | 10 | | | | 74 |
| peanut | 84–100 | b 17.1 | 61.1 | 21.8 | | | | |
| | | c 18 | 40–52 | 25–32 | | | | |
| perilla | 185–208 | a 7 | 14 | 16 | | 63 | | |
| rape | 94–108 | c | | | 40 | | | |
| safflower | 122–152 | c 10 | 13 | 78 | | | | |
| sesame | 103–117 | c 15 | 40 | 44 | | | | |
| soybean | 120–143 | a 14 | 26 | 52 | | 8 | | |
| | | b 13.4 | 28.9 | 50.7 | | 7 | | |
| | | c 16 | 20–25 | 48–53 | | 5–9 | | |
| sunflower | 125–136 | c 10 | 17–32 | 60–75 | | 0.3 | | |
| tung | 160–175 | a 5 | 7 | 3 | | | 85 | | a Lange, Handbook of Chemistry, Tenth Edition, 1961, page 772
b MGraw-Hill, Encyclopedia of Science and Technology, Third Edition, Vol. 3, page 58 and Vol. 5, page 200
c Van Nostrand's Scientific Encyclopedia, Sixth Edition, tables following page 2913

In order to facilitate spraying and dispersion of the scrubbing liquid containing unsaturated fatty oil, it is preferred that the oil be emulsified with water to provide a scrubbing liquid having a viscosity lower than the viscosity of the oil. For this purpose the preferred proportions depend to a great extent on the characteristics of the pollution and the method of treatment. For example in a typical rendering application where beef, poultry and fish are being reduced and the air contains noxious or odorous components in the amount of approximately 400 ppm, scrubbing liquid containing, by weight, 28 percent peanut oil, 2 percent wetting agent, 1 percent acetic acid, 1 percent propylene glycol and 70 percent water can be added at the rate of 8 ozs. per hr. to a scrubbing system handling an airflow of 30,000 cfm.

The acetic acid combines with a significant proportion of ammonia and volatile ammoniacals sorbed by the oil emulsion causing them to be precipitated for collection. The propylene glycol assists in sorbing sulfur-bearing vapors such as methyl or ethyl mercaptans. Substantially the entire balance of the scrubbing liquid is water, but the scrubbing liquid could include a small amount of emulsifier, detergent and/or wetting agent. The proportion of such additive or additives should be in the range of one-half percent to five percent by weight, a preferred amount being 1½ percent. The detergent or wetting agent improves the contact between the air and the sorbent to increase the effectiveness of the scrubbing liquid in removing pollutants from the air stream, especially particulates. Suitable detergent or wetting agents are commercial wetting agents or detergents such as anionic wetting agent Atlas G. 3300, cationic detergent B10-DAC 50-22 of Bio Lab, Inc., Decatur, Ga., and nonionic detergent Van Wet 9N9 of Van Waters and Rogers, Seattle, Washington which may be used in the amount of ⅛ to 1%.

vents 10 percent to 50 percent, for organic waste 0.01 percent to 6 percent and for incineration process emissions 0.001 percent to 2 percent. The scrubbing solution may also contain suitable reactants or catalysts including metals, metal salts, oxidants, reducers, aldehydes and amines to decompose or complex sorbed chemicals to facilitate their removal from the scrubbing liquid.

In general the warmer the emission the lower will be the concentration of oil required in the scrubbing liquid and the colder the emission the higher will be the concentration of oil required in the scrubbing liquid. Where the emission is warmer more scrubbing liquid or more concentrated scrubbing liquid is desirable to compensate for evaporation losses of the scrubbing liquid. In order to recondition the oil of the scrubbing liquid for reuse, the oil and water are separated and pollutants removed from the air are stripped from the oil. Such stripping can be effected by the use of steam in accordance with known procedures. The steaming may be effected in successive stages under pressures of 100 to 150 pounds gauge and temperatures of 425 degrees to 475 degrees F. (218 degrees to 246 degrees C.). Steam stripping of fatty oils is disclosed in the Wecker U.S. Pat. No. 1,622,126, issued in 1927.

Heating of the fatty oil can be effected by the use of a heating agent designated Dowtherm which is a eutectic mixture consisting of 26.5 percent diphenyl and 73.5 percent diphenyl oxide.

Also, stripping of the fatty oil could be accomplished continuously by use of the deodorization procedure disclosed in Dean U.S. Pat. No. 2,280,896, issued Apr. 28, 1942.

An important specific utilization of scrubbing liquid including vegetable, marine or land animal oil for air purification is for the removal of styrene from air. The affinity of the oil for styrene and polystyrene will enable the aqueous scrubbing liquid of the present invention to remove such materials from an air stream. The styrene material can then be stripped from the oil by polymerizing the styrene to form solid particulate polystyrene which will be precipitated from the oil. Such polymerization is effected by light, preferably by sunlight, but, alternatively or supplementally, by ultraviolet light or other known conventional means such as by the use of catalysts. The water portion can then be separated from the oil by stratification at which time much of the polymerized and unpolymerized styrenes will precipitate and settle by gravity in the water portion. The separated oil portion of the scrubbing liquid may be washed and makeup water added for reuse. The scrubbing liquid rejuvenation process may also be conducted on a continuous basis with makeup water and oil being supplied continuously in sufficient quantity to replace operational losses.

As a specific example, where the emission includes approximately 106 ppm methyl styrene vapors in 3000 cfm, approximately 5 percent of scrubbing solution containing, by weight, 30 percent fatty oil, 2 percent wetting agent and 70 percent water is added at the rate of approximately 10 ozs. of fresh scrubbing liquid per operating hour. The styrene can be precipitated from the used scrubbing liquid by ultraviolet light, preferably having an intensity of 1800 to 2300 angstrom units.

An alternative specific formula for removing styrene from air where ultraviolet light is not used to precipitate the styrene from the scrubbing solution could be as follows:

|  | percent by weight |
| --- | --- |
| safflower oil | 24.0 |
| wetting agent (Atlas G. 3300) | 1.0 |
| silicone (antifoam) | 1.0 |
| water | 73.0 |
| titanium tetrachloride | .5 |
| aluminum chlorhydrate or | .5 |
| aluminum hydroxide or aluminum oxide | |
| | 100.0 |

The titanium tetrachloride and aluminum chlorhydrate, aluminum hydroxide or aluminum oxide serve as catalysts to expedite the pollutant sorbing action and to form innocuous complexes with styrene or to promote polymerization of the styrene.

In another example where the emission contains mixed solvents from a paint booth, sunflower oil can be atomized into the gaseous emission. The oil and sorbed solvents are then collected and rinsed with water. Preferably some detergent is used to effectuate more complete solvent removal. The oil purged of pollutants may be resprayed into the gaseous emission.

Another particularly beneficial use of a scrubbing liquid including fatty oil is for the removal of acrolein from air. Acrolein is a toxic, colorless liquid aldehyde (CH2=CHCHO) that has an acrid odor and irritating vapors and is produced in meat or offal cooking operations. Acrolein can be stripped from the fatty oil by treating the oil with urea and ammonia to form acrolein complex precipitates. Suitable ammonia sources are amines. A representative formula for treating the air is:

|  | percent by weight |
| --- | --- |
| peanut oil | 28 |
| wetting agent (Atlas G-3300) | 1 |
| silicone (antifoam) | 1 |
| water | 70 |
| | 100 |

This basic formula is additionally mixed with water from 1 to 10 percent concentration by weight or volume for use as a scrubbing liquid. The percentage of concentrate depends on the volume and concentration of noxious or odorous vapor components in a gas stream.

After the pollutants are stripped from the fatty oil, it is again mixed in the desired proportions with water, emulsifier, detergent and/or wetting agent to reconstitute the scrubbing liquid.

An example that may be used for the control of mixed biological odors resulting from a rendering plant is as follows:

|  | percent by weight |
| --- | --- |
| sunflower oil | 20.0 |
| propylene glycol | 1.0 |
| sulfuric acid | 0.5 |
| wetting agent (Atlas G-3300) | 0.5 |
| water | 78.0 |
| | 100.0 |

In this instance the emission stream is alkaline, containing a significant proportion of ammonia which will be sequestered by the oil emulsion and complexed by the added acid.

The scrubbing liquid can be added to an emission system in a wide variety of concentrations depending on the equipment design but would typically be metered into a system which already contained a substantial portion of water, several hundred gallons, for example, and, depending on the flow rate of the emission and the pollutant concentration, such scrubbing liquid would be added to the reservoir water in amounts in the order of 2–3 percent, then metered at a continuous rate of the order of 5 ozs. per 2,500 cfm per hour during operation.

A typical formula for sewage emissions from pumping station sumps is:

|  | percent by weight |
| --- | --- |
| waste cooking oil which could include cottonseed oil, rape oil, corn oil, soybean oil and/or peanut oil | 10 |
| propylene glycol | 2 |
| water | 88 |
| | 100 |

Propylene glycol sorbs hydrogen sulfide and acts as a wetting agent.

This formula could be supplied at the rate of 5 ozs. per 2500 cfm of sewage gases evolved to a water flow of from 3 to 10 gpm. The water and scrubbing liquid could be discharged directly into the sewer or a sump. Where amines create an odor problem selected aldehydes, such as benzaldehyde, croton aldehyde, acetaldehyde, butyraldehyde and gluteraldehyde could be added to the scrubbing liquid. If fatty acids cause a problem a complexing amine agent such as dimethylamine, trimethylamine, ethylamine, diacetylamine, morpholine and ethanolomine, or other bases such as ammonia, could be added to the scrubbing liquid. Instead of adding such substances to the scrubbing liquid an appropriate complexing agent as suggested above could be used to rinse or treat the scrubbing liquid to prepare it for recycling.

The scrubbing liquid of the present invention can be used in various types of contact means for effecting contact of polluted gas with the scrubbing liquid, such as conventional air purification scrubbers or filters of excelsior, matted or woven shredded paper or shavings, for example, on which or over which the scrubbing liquid is dripped.

Specific noxious odors which have been virtually eliminated by contact with scrubbing liquid of this invention are octanol-1, octanol-2 (octyl alcohol), triethylamine, pyridine, cell cream (putrified), i.e. residue from dead animal cells including yeast cells, such as in breweries, styrene, butyric acid, phenol, ammonium thioglycolate, acetates including amyl acetate and butyl acetate, ammonium hydroxide, p-anisaldehyde, furfural, formaldehyde, methylethyl ketone, glacial acetic acid, propionic acid, acrolein, toluene, valeric acid, diethylamine, methylamine, methyl chloride, carbon tetrachloride, petroleum distillate, malathion, orthodichlorobenzene, cadaverine, skatol, soluble fish waste, beef rendering, chicken rendering, onion oil, garlic oil, volatile amines, volatile fatty acids, sewage, sulfurous material including hydrogen sulfide, carbon disulfide and mercaptans, trichloroethylene, pentachlorophenol, paint, paint solvents, hydrocarbon material, plastics such as phenolic or epoxy resins, and combustion products.

Of the odorous materials listed above, the following are extensively soluble in water, namely, triethylamine, pyridine, butyric acid, phenol, ammonium hydroxide, hydrogen sulphide, formaldehyde, methylethyl ketone, glacial acetic acid, propionic acid, diethylamine, methylamine, methyl chloride and cadaverine, whereas the following substances are either completely insoluble in water or only slightly soluble, namely, octanol-1, octanol-2, styrene, carbon disulphide, amyl acetate, p-anisaldehyde, furfural, toluene, valeric acid, carbon tetrachloride, orthodichlorobenzene, petroleum distillate, trichloroethylene and pentachlorophenol. The treatment of polluted air with the vegetable, marine or land animal oil of the present invention removes both such water-soluble pollutants and such water-insoluble pollutants with the same scrubbing medium.

Figure 1:
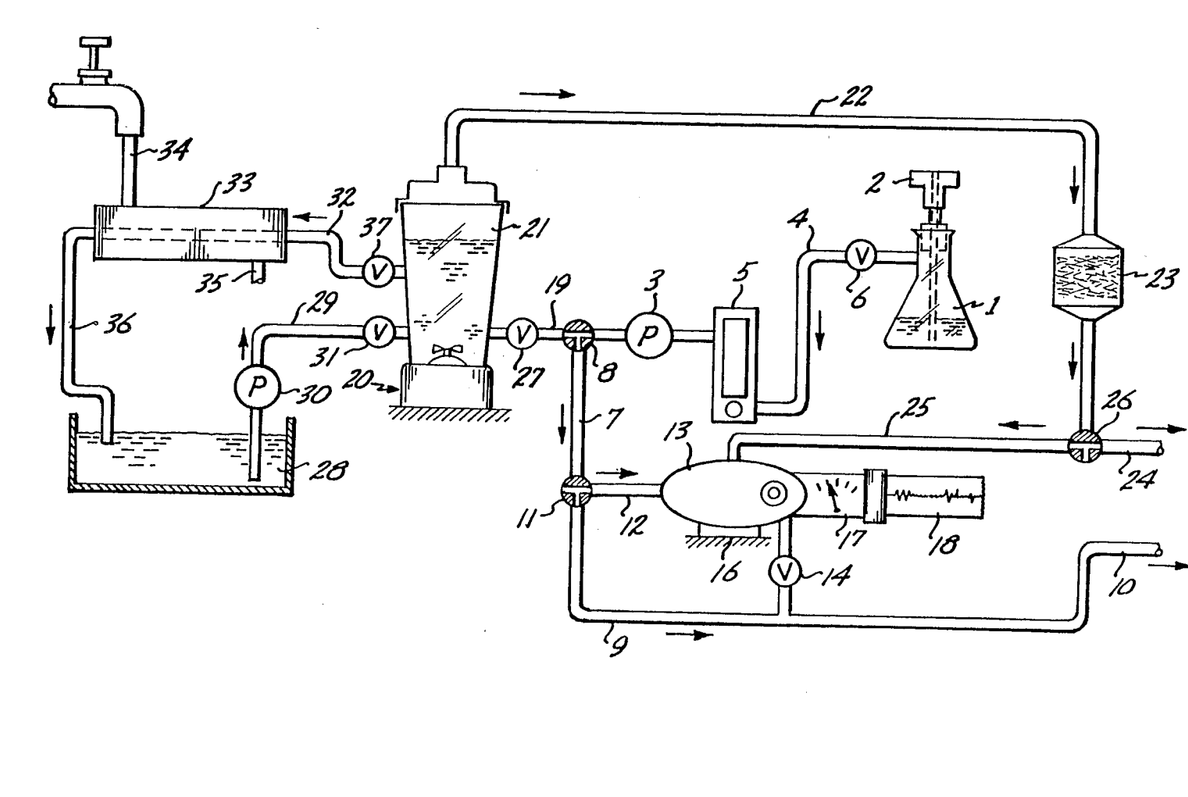
The drawing is a diagrammatic representation of a scrubber installation which can be used for testing the effectiveness of scrubbing liquids for clarifying air.

A laboratory apparatus for testing the effectiveness of various scrubbing liquids for removing odorants from air is shown in the drawings. The odorant material, usually in liquid form, is supplied in an Erlenmeyer flask 1 to which air is admitted through a filter 2. Odorant-charged air is withdrawn from the upper portion of the flask by an air pump 3 through a discharge conduit 4. A flowmeter 5 is connected in such line to indicate the amount of air flowing through the conduit 4. Such airflow can be regulated by a valve 6 in the conduit.

The odorized or polluted air discharge conduit 4 can be connected to a conduit 7 by appropriate setting of a three-way valve 8. The conduit 7 can be connected to an air discharge line 9 having an outlet 10 if a three-way valve 11 is set properly to connect conduits 7 and 9. The discharged air can be checked olfactorily at the outlet 10 for residual odor.

To identify the odorant by instrumentation, the three-way valve 11 can be turned to connect the conduit 7 to the inlet conduit 12 leading to a Wilkes Miran scanning infrared spectrographic analyzer 13. From such analyzer, the polluted air is discharged through a conduit 14 to the discharge conduit 9. The conduit 14 may have a check-valve 16 in it to prevent reverse flow through the analyzer. The analyzer may be provided with a visual meter 17 for indicating the intensity of the odor and a graphic recorder 18 may be used to record fluctuations in the odor intensity.

To determine the effectiveness of a particular scrubbing liquid the three-way valve 8 can be turned to divert the flow of odorous air from the conduit 7 to the conduit 19 which is connected to the intake of a blender 20 containing scrubbing liquid 21. From the blender air purged of odorant is discharged through a conduit 22 in which a dryer 23 containing calcium chloride is located. The conduit 22 may be connected either to an outlet 24 where the air can be checked olfactorily or to a conduit 25 connected to the Wilkes Miran analyzer by appropriate adjustment of a three-way valve 26.

The blender 20 can operate either in a batch operation by a predetermined quantity of the scrubbing liquid 21 simply being placed in the blender, or the scrubbing liquid can be recirculated to replace the scrubbing liquid in the blender continuously. In the latter instance, scrubbing liquid can be contained in a reservoir 28 which will be very large as compared to the volume of the blender container. From such reservoir scrubbing liquid is supplied to the blender container continuously through the supply conduit 29 by a pump 30. The amount of scrubbing liquid admitted to the blender can be regulated by a metering valve 31.

Scrubbing liquid 21 is discharged from the blender container on a continuous basis to maintain the level of scrubbing liquid in the blender constant by discharging scrubbing liquid continuously from the blender container through the conduit 32. A condenser or cooler 33 is interposed in the conduit 32 to maintain the temperature of the scrubbing liquid at a predetermined value. Cold water can be supplied to the cooler or condenser through a supply conduit 34 and discharged from the cooler through a discharge conduit 35. From the cooler the scrubbing liquid is returned to the reservoir 28 through the conduit 36.

The amount of scrubbing liquid discharged from the blender container can be regulated by a metering valve 37 to balance the amount of scrubbing liquid supplied to the blender container through the supply conduit 29. Alternatively a portion of the outlet conduit 32 can be located at a level relative to the blender container such that if the level of the liquid in the blender container tends to exceed a predetermined level the excess scrubbing liquid will be discharged from the blender container through the outflow conduit 32, in which case the regulating valve 37 can be omitted.

Initially, the three-way valve 8 may be set to connect conduit 4 to conduit 7 and three-way valve 11 may be set to connect conduit 7 to conduit 9. The air pump 3 can then draw air through the filter 2 into the Erlenmeyer flask 1 to pick up odorant. The odorized air passing through the conduits 4, 7 and 9 will be discharged through the outlet 10 so that the odor can be detected olfactorily. The three-way valve 8 can then be changed to connect conduit 4 to conduit 19 for supplying the odorized air to the blender, and three-way valve 26 can be set to connect discharge conduit 22 to outlet 24. The purged air discharged through outlet 24 can then be compared olfactorily with the odorized air previously discharged through outlet 10 to detect the effectiveness of odor removal by the scrubbing liquid 21.

As an alternative operation, instead of comparing the odorized and purged air olfactorily, the three-way valve 11 can be set to connect the conduit 7 to the conduit 12 so that the Wilkes Miran analyzer 13 will detect and indicate the odorant content of the air visually and can record such content. Valve 8 can then be altered to connect conduit 4 to conduit 19, and valve 26 can be altered to connect conduit 22 to conduit 25 so that the air purged of odorant by the scrubbing liquid can be circulated through the Wilkes Miran analyzer 13 for comparison with the record made of the odorized air.

Whether the air is checked olfactorily or by the Wilkes Miran analyzer the blender can be operated with the single charge of purging liquid and the analyzer can be operated over a period of time to determine the rapidity with which the effectiveness of the scrubbing liquid decreases. Alternatively, the scrubbing liquid recirculation system described above can be operated in which event the purging effect of the scrubbing liquid 21 should remain substantially constant.

Purging of various types of odorants from air occurred utilizing the following variety of types of oil and water emulsions in the blender, namely peanut, walnut, safflower, tung, herring, sunflower seed, soybean, apricot-kernel, almond, sesame, rice bran, pumpkin seed, wheat germ, and corn. The rate of odorant air flow through the blender was 1800 cc per minute at 28 degrees C. In each instance the analyzer showed approximately 99 percent purging of the odorant and no odor could be detected olfactorily in the treated air.

We claim:

1. A process for purifying polluted gas which comprises contacting the gas with drying or semidrying vegetable, marine or land animal oil having an average iodine value of at least 90 and thereby removing pollutant from such gas.

2. The process defined in claim 1, in which the gas is contacted with the oil in gas and liquid contact means.

3. The process defined in claim 1, in which the oil is emulsified with water to provide a contacting liquid having a viscosity lower than the viscosity of the oil.

4. The process defined in claim 1, including treating the oil that has been contacted by polluted gas to separate from such oil pollutant removed from the gas by such oil and thereby reconditioning the oil for reuse in purifying additional polluted gas.

5. The process defined in claim 1, including mixing water with the oil to make an aqueous scrubbing liquid for contact with the polluted gas.

6. The process defined in claim 5, in which the scrubbing liquid includes by weight approximately 28 percent vegetable, marine or land animal oil and approximately 70 percent water.

7. The process defined in claim 5, in which the scrubbing liquid includes by weight from 0.001 percent to 50 percent of vegetable, marine or land animal oil.

8. The process defined in claim 5, including mixing a surfactant with the oil and water in making the scrubbing liquid for facilitating contact of the oil content of the scrubbing liquid with the gas pollutant.

9. The process defined in claim 5, in which the scrubbing liquid includes an ingredient selected from the group consisting of oxidizers, reducing agents, halogens, aldehydes, metals, buffering agents, adsorbants, absorbants, catalysts and polymerizing agents.

10. The process defined in claim 5, in which the scrubbing liquid includes a metal component selected from the group consisting of titanium tetrachloride, aluminum chlorhydrate, aluminum hydroxide and aluminum oxide.

11. The process defined in claim 5, in which the scrubbing liquid includes wetting agent, acetic acid and propylene glycol.

12. The process defined in claim 11, in which the scrubbing liquid contains by weight approximately 28 percent of vegetable, marine or land animal oil, approximately 2 percent of wetting agent, approximately 1 percent of acetic acid, approximately 1 percent of propolene glycol and the balance water.

13. The process defined in claim 1, in which the gas to be purified carries water-soluble pollutant and, following the purifying operation, rinsing the oil and solvents sorbed thereby with water for freeing the oil from pollutant and again using such oil for contacting polluted gas for removing pollutant therefrom.

14. The process defined in claim 13, including supplying detergent to the rinse water before it is used to rinse the oil.

15. A process for purifying air polluted with styrene which comprises contacting the air with drying or semidrying vegetable, marine or land animal oil and thereby removing styrene from such air.

16. The process defined in claim 15, including treating the oil that has been contacted by polluted air with radiation to separate from such oil styrene removed from the air by such oil.

17. The process defined in claim 15, including treating the oil that has been contacted by polluted air with ultraviolet light radiation to separate from such oil styrene removed from the air by such oil.

18. The process defined in claim 15, including with the oil titanium tetrachloride and an aluminum compound to expedite the pollutant sorbing action and to free the styrene from the oil.

19. The process defined in claim 18, in which the aluminum compound is selected from the group consisting of aluminum chlorhydrate, aluminum hydroxide and aluminum oxide.

20. A process for purifying air polluted with acrolein which comprises contacting the air with drying or semidrying vegetable, marine or land animal oil and thereby removing acrolein from such air.

21. A process for purifying air polluted with odorant resulting from activities selected from the group consisting of sewage processing, food preparation, meat or fish reduction, painting operations, enamel baking, petroleum refining and combustion which comprises contacting the air with drying or semidrying vegetable, marine or land animal oil havng an average iodine value of at least 90, and thereby removing odorant from such air.

22. A process for purifying polluted air carrying odorant selected from the group consisting of octanol-1, octanol-2, triethylamine, pyridine, styrene, butyric acid, phenol, ammonium thioglycolate, acetates, ammonium hydroxide, p-anisaldehyde, furfural, formaldehyde, methylethyl ketone, galcial acetic acid, propionic acid, acrolein, toluene, valeric acid, diethylamine, methylamine, methyl chloride, carbon tetrachloride, petroleum distillate, malathion, orthodichlorobenzene, cadaverine, skatol, trichloroethylene and pentachlorophenol, which process comprises contacting such polluted air with drying or semidrying vegetable, marine or land animal oil having an average iodine value of at least 90 and thereby removing odorant from the air.

23. A process for purifying polluted gas carrying a plurality of odorants including odorant extensively soluble in water and odorant substantially insoluble in water, which process comprises contacting the gas with vegetable, marine or land animal oil and thereby removing from the gas both odorant extensively soluble in water and odorant substantially insoluble in water.

24. The process defined in claim 23, which the oil is drying or semidrying oil having an average iodine value of at least 90.

25. A process for purifying polluted gas which comprises contacting the gas with drying or semidrying marine oil selected from the group consisting of cod-liver oil, dolphin or porpoise oil, herring oil, menhaden oil, sardine oil, seal oil, shark oil and whale oil, and thereby removing odorant from such gas.

26. The process defined in claim 25, in which the drying or semidrying marine oil is emulsified with water to provide a contacting liquid having a viscosity lower than the viscosity of the oil.

27. A process for purifying polluted gas which comprises contacting the gas with unsaturated vegetable, marine or land animal oil having an average iodine value of at least 90 of which more than half of its content by weight is polyunsaturated fatty acid material i.e. havng more than one double bond between carbon atoms, and thereby removing odorant from such gas.

28. The process defined in claim 27, in which the oil is emulsified with water to provide a contacting liquid having a viscosity lower than the viscosity of the oil.

29. The process for purifying air polluted with styrene which comprises contacting the air with scrubbing liquid containing vegetable, marine or land animal oil and metal material selected from the group consisting of titanium tetrachloride, aluminum chlorhydrate, aluminum hydroxide and aluminum oxide, and thereby promoting polymerization of the styrene in removing the styrene from the air.

30. A process for purifying air polluted with acrolein which comprises contacting the air with scrubbing liquid containing vegetable, marine or land animal oil and thereby removing acrolein from the air and thereafter treating the oil with urea and ammonia for forming acrolein complex precipitates and thereby removing acrolein from the scrubbing liquid.

31. A process for purifying air polluted with gas from sewage emission which comprises contacting the gas with waste cooking oil having an average iodine value of at least 90 including oil selected from the group consisting of cottonseed oil, rape oil, corn oil, soybean oil and peanut oil, and thereby removing odorant from such air.

32. The process defined in claim 31, in which the gas-contacting liquid includes propylene glycol and water.

33. The process defined in claim 31, in which the gas-contacting liquid includes approximately 10 percent of waste cooking oil, approximately 2 percent of propylene glycol and the balance water.

34. The process defined in claim 31, in which the scrubbing liquid includes aldehyde.

35. The process defined in claim 31, in which the scrubbing liquid includes a complexing amine agent.

36. The process defined in claim 35, in which the complexing amine agent is selected from the group consisting of dimethylamine, trimethylamine, ethylamine, diacetylamine, morpholine and ethanolomine.

37. A process for purifying polluted gas which comprises contacting the gas with drying or semidrying vegetable or marine oil having an average iodine value of at least 90 selected from the group consisting of candlenut oil, dehydrated castor oil, hempseed oil, linseed oil, menhaden oil, oiticica oil, perilla oil, poppy-seed oil, safflower oil, sardine oil, stillingia oil, tung oil, soybean oil, sunflower oil, corn oil, cottonseed oil, grape-seed oil, kapok oil, mustard-seed oil and sesame oil, and thereby removing pollutant from such gas.

38. A process for purifying polluted gas which comprises contacting the gas with vegetable oil havng an average iodine value of at least 90 selected from the group consisting of rape oil, almond oil, apricot-kernel oil and peanut oil, and thereby removing pollutant from such gas.

39. A process for purifying polluted gas which comprises contacting the gas with vegetable oil or marine oil having an average iodine value of at least 90 selected from the group consisting of candlenut oil, dehydrated castor oil, hempseed oil, linseed oil, menhaden oil, oiticica oil, perilla oil, poppy-seed oil, safflower oil, sardine oil, stillingia oil, tung oil, soybean oil, sunflower oil, corn oil, cottonseed oil, grape-seed oil, kapok oil, mustard-seed oil, sesame oil, rape oil, almond oil, apricot-kernel oil and peanut oil, and thereby removing pollutant from such gas.

40. A process for purifying polluted gas which comprises contacting the polluted gas with vegetable or marine oil havng an average iodine value of at least 90 selected from the group consisting of corn oil, cottonseed oil, peanut oil, rape oil, safflower oil, soybean oil, sunflower oil, almond oil, hempseed oil, linseed oil, sesame oil, tung oil, walnut oil, wheat-germ oil, acorn oil, apricot-kernel oil, beechnut oil, brazil nut oil, candlenut oil, chaulmoogra oil, cherry kernel oil, cod-liver oil, crambe seed oil, croton oil, dehydrated castor oil, dolphin or porpoise oil, grapefruit seed oil, grape-seed oil, herring oil, kapok oil, menhaden oil, mustard-seed oil, oiticica oil, orangeseed oil, perilla oil, plum kernel oil, poppy-seed oil, pumpkin-seed oil, ravison oil, rice-bran oil, sardine oil, seal oil, shark oil, sorghum oil, stillingia oil and whale oil, and thereby removing pollutant from such gas.

41. A process for purifying polluted gas which comprises contacting the polluted gas with semidrying or nondrying vegetable oil having an average iodine value of at least 90 selected from the group consisting of acorn oil, Brazil nut oil, rape oil, almond oil, apricot-kernel oil, grapefruit seed oil, mustard-seed oil, orangeseed oil, plum kernel oil, ravison oil, rice-bran oil and peanut oil and thereby removing odorant from such gas.

42. A process for purifying polluted air carrying odorant selected from the group consisting of octanol-1, octanol-2, triethylamine, pyridine, styrene, butyric acid, phenol, ammonium thioglycolate, acetates, ammonium hydroxide, p-anisaldehyde, furfural, formaldehyde, methylethyl ketone, glacial acetic acid, propionic acid, acrolein, toluene, valeric acid, diethylamine, methylamine, methyl chloride, carbon tetrachloride, petroleum distillate, malathion, orthodichlorobenzene, cadaverine, skatol, trichloroethylene and pentachlorophenol, which comprises contacting such polluted air with vegetable oil selected from the group consisting of corn oil, cottonseed oil, peanut oil, rape oil, safflower oil, soybean oil and sunflower oil.

43. A process for purifying polluted air carrying odorant selected from the group consisting of octanol-1, octanol-2, triethylamne, pyridine, styrene, butyric acid, phenol, ammonium trioglycolate, acetates, ammonium hydroxide, p-anisaldehyde, furfural, formaldehyde, methylethyl ketone, glacial acetic acid, propionic acid, acrolein, toluene, valeric acid, diethylamine, methylamine, methyl chloride, carbon tetrachloride, petroleum distillate, malathion, orthodichlorobenzene, cadaverine, skatol, trichloroethylene and pentachlorophenol, which comprises contacting such polluted air with vegetable oil selected from the group consisting of corn oil, cottonseed oil, peanut oil, rape oil, safflower oil, soybean oil, sunflower oil, almond oil, hempseed oil, linseed oil, sesame oil, tung oil, walnut oil and wheat-germ oil.

44. A process for purifying polluted air carrying odorant selected from the group consisting of octanol-1, octano-2, triethylamine, pyridine, styrene, butyric acid, phenol, ammonium thioglycolate, acetates, ammonium hydroxide, p-anisaldehyde, furfural, formaldehyde, methylethyl ketone, glacial acetic acid, propionic acid, acrolein, toluene, valeric acid, diethylamine, methylamine, methyl chloride, carbon tetrachloride, petroleum distillate, malathion, orthodichlorobenzene, cadaverine, skatol, trichloroethylene and pentachlorophenol, which comprises contacting such polluted air with vegetable or marine oil selected from the group consisting of corn oil, cottonseed oil, peanut oil, rape oil, safflower oil, soybean oil, sunflower oil, almond oil, hempseed oil, linseed oil, sesame oil, tung oil, walnut oil, wheat-germ oil, acorn oil, apricot-kernel oil, beechnut oil, brazil nut oil, candlenut oil, chaulmoogra oil, cherry kernel oil, cod-liver oil, crame seed oil, croton oil, dehydrated castor oil, dolphin or porpoise oil, grapefruit seed oil, grape-seed oil, herring oil, kapok oil, menhaden oil, mustard-seed oil, oiticica oil, orangeseed oil, perilla oil, plum kernel oil, poppy-seed oil, pumpkinseed oil, ravison oil, rice-bran oil, sardine oil, seal oil, shark oil, sorghum oil, stillingia oil and whale oil, and thereby removing pollutant from such gas.

45. A process for purifying polluted air carrying odorant selected from the group consisting of octanol-1, octanol-2, triethylamine, pyridine, styrene, butyric acid, phenol, ammonium thioglycolate, acetates, ammonium hydroxide, p-anisaldehyde, furfural, formaldehyde, methylethyl ketone, glacial acetic acid, propionic acid, acrolein, toluene, valeric acid, diethylamine, methylamine, methyl chloride, carbon tetrachloride, petroleum distillate, malathion, orthodichlorobenzene, cadaverine, skatol, trichloroethylene and pentachlorophenol, which comprises contacting such polluted air with vegetable or marine oil selected from the group consisting of corn oil, cottonseed oil, peanut oil, rape oil, safflower oil, soybean oil, sunflower oil, almond oil, hempseed oil, linseed oil, sesame oil, tung oil, walnut oil, wheat-germ oil, acorn oil, apricot-kernel oil, beechnut oil, brazil nut oil, candlenut oil, chaulmoogra oil, cherry kernel oil, cod-liver oil, crame seed oil, croton oil, dehydrated castor oil, dolphin or porpoise oil, grapefruit seed oil, grape-seed oil, herring oil, kapok oil, menhaden oil, mustard-seed oil, oiticica oil, orangeseed oil, perilla oil, plum kernel oil, poppy-seed oil, pumpkinseed oil, ravison oil, rice-bran oil, sardine oil, seal oil, shark oil, sorghum oil, stillingia oil and whale oil emulsified with water by mixing it with the oil and water a surfactant selected from the group consisting of wetting agents and detergents.

46. A process for purifying polluted gas which comprises contacting the polluted gas with drying or semidrying oil having an average iodine value of at least 90 selected from the group consisting of candlenut oil, dehydrated castor oil, hempseed oil, linseed oil, menhaden oil, oiticica oil, perilla oil, poppy-seed oil, safflower oil, sardine oil, stillingia oil, tung oil, soybean oil, sunflower-seed oil, corn oil, cottonseed oil, grape-seed oil, kapok oil, mustard-seed oil and sesame oil, and thereby removing odorant from such gas.

47. A process for purifying air polluted with odorant resulting from processing of food products or food preparation, including meat or fish, volatile amines and volatile fatty acids, which comprises contacting the air with drying or semidrying vegetable, marine or land animal oil having an average iodine value of at least 90, and thereby removing odorant from such air.

48. A process for purifying air polluted with pollutant resulting from combustion, paint, painting operations and enamel baking, including hydrocarbons, sulfurous material or paint solvents, which comprises contacting the air with drying or semidrying vegetable, marine or land animal oil having an average iodine value of at least 90, and thereby removing pollutant from such air.

49. A process for purifying air polluted with pollutant resulting from paint, painting operations and enamel baking, including hydrocarbons or paint solvents, which comprises contacting the air with drying or semidrying vegetable, marine or land animal oil having an average iodine value of at least 90, and thereby removing pollutant from such air.

50. A process for purifying air polluted with odorant resulting from sewage or sewage processing, which comprises contacting the air with drying or semidrying vegetable, marine or land animal oil having an average iodine value of at least 90, and thereby removing sewage odorant from such air.

51. A process for purifying air polluted with odor resulting from the group consisting of cell cream (putrefied), onion oil and plastics, which comprises contacting the air with drying or semidrying vegetable, marine or land animal oil having an average iodine value of at least 90, and thereby removing odorant from such air.

52. A process for purifying air polluted with odorant resulting from the group consisting of cell cream (putrefied), soluble fish waste, meat rendering, onion oil, volatile amines, volatile fatty acids, sewage, sulfurous material, paint, paint solvents, hydrocarbon material, plastics and combustion products, which comprises contacting such air with drying or semidrying vegetable, marine or land animal oil having an average iodine value of at least 90, and thereby removing sewage odorant from such air.

* * * * *

UNITED STATES PATENT AND TRADEMARK OFFICE
CERTIFICATE OF CORRECTION

PATENT NO. : 4,844,721                                  Page 1 of 2
DATED      : July 4, 1989
INVENTOR(S) : James P. Cox and Robert W. D. Cox It is certified that error appears in the above-identified patent and that said Letters Patent is hereby corrected as shown below:

Column 8, line 19, cancel "following page 2914" and insert --on pages 2915, 2916 and 2917--;

Column 9, line 50, after "oils" insert --, and a few reasonably effective nondrying oils--; (2nd occurrence)

Column 11, the "c" footnote beneath the chart, cancel "following page 2913" and insert --on pages 2915, 2916 and 2917--;

Column 15, line 7, after "liquid" insert --used in the process--; line 15, cancel "of" and insert --in accordance with--;

Claim 12: column 18, line 14, cancel "propolene" and insert --propylene--;

Claim 21: column 18, line 54, change "havng" to --having--;

Claim 22: column 18, line 62, change "galcial" to --glacial--;

Claim 24: column 19, line 10, before "which" insert --in--;

Claim 27: column 19, line 29, change "havng" to --having--;

Claim 31: column 19, line 51, after "with" insert --scrubbing liquid containing--;

UNITED STATES PATENT AND TRADEMARK OFFICE
CERTIFICATE OF CORRECTION

PATENT NO. : 4,844,721

DATED : July 4, 1989

INVENTOR(S) : James P. Cox and Robert W. D. Cox

It is certified that error appears in the above-identified patent and that said Letters Patent is hereby corrected as shown below:

Claim 32: column 19, line 57, cancel "gas-contacting" and insert --scrubbing--;

Claim 33: column 19, line 60, cancel "gas-contacting" and insert --scrubbing--; same line, after "includes" insert --by weight--;

Claim 38: column 20, line 14, change "havng" to --having--;

Claim 40: column 20, line 32, change "havng" to --having--;

Claim 43: column 21, line 3, change "triethylamne" to --triethylamine--; line 4, change "trioglycolate" to --thioglycolate--;

Claim 44: column 21, line 19, change "octano-2" to --octanol-2--;

Signed and Sealed this

Twenty-fifth Day of June, 1991

Attest:

HARRY F. MANBECK, JR.

Attesting Officer

Commissioner of Patents and Trademarks